United States Patent

Oga et al.

[11] Patent Number: 5,766,295
[45] Date of Patent: Jun. 16, 1998

[54] METHOD OF MANUFACTURING A SPIRAL FLUORESCENT TUBE

[75] Inventors: Toshiyoshi Oga, Otsu; Masaru Saito, Takatsuki; Shunji Asai, Otsu, all of Japan

[73] Assignee: Matsushita Electronics Corporation, Osaka, Japan

[21] Appl. No.: 757,459

[22] Filed: Nov. 27, 1996

Related U.S. Application Data

[62] Division of Ser. No. 405,995, Mar. 17, 1995, Pat. No. 5,610,476.

[51] Int. Cl.⁶ .................................................. C03B 23/04
[52] U.S. Cl. ...................... 65/108; 65/109; 65/276; 65/DIG. 9
[58] Field of Search .................... 65/108, 109, 276, 65/281, 292, 296, 87, 402, DIG. 9; 264/281, DIG. 40; 72/134, 139, 142, 305; 140/92.9; 445/22; 29/896.9

[56] References Cited

U.S. PATENT DOCUMENTS

| D. 280,345 | 8/1985 | Paget | D26/3 |
|---|---|---|---|
| 1,726,279 | 8/1929 | Werner | 72/139 |
| 2,177,743 | 10/1939 | Pfaff . | |
| 2,426,990 | 9/1947 | Ellefson | 65/109 |
| 2,476,658 | 7/1949 | Greiner | 65/281 |
| 2,491,857 | 12/1949 | Greiner | 65/108 |
| 2,523,015 | 9/1950 | Greiner | 65/108 |
| 2,614,588 | 10/1952 | Laycock | 140/92.2 |
| 3,186,820 | 6/1965 | Adkins | 65/281 |
| 3,993,465 | 11/1976 | Hurx et al. | 65/281 |
| 4,422,863 | 12/1983 | Hosoya et al. | 65/108 |
| 4,772,819 | 9/1988 | Ridders | 313/493 |
| 4,871,944 | 10/1989 | Skwirut | 313/493 |
| 5,244,486 | 9/1993 | Soo | 65/281 |

FOREIGN PATENT DOCUMENTS

| 45-11232 | 4/1970 | Japan | 65/109 |
|---|---|---|---|
| 58-14447 | 1/1993 | Japan | 65/108 |
| 49908 | 10/1984 | Rep. of Korea . | |
| 85-3187 | 12/1985 | Rep. of Korea . | |
| 75255 | 10/1987 | Rep. of Korea . | |
| 624977 | 6/1949 | United Kingdom | 65/281 |

*Primary Examiner*—Steven P. Griffin
*Attorney, Agent, or Firm*—Morrison & Foerster LLP

[57] ABSTRACT

A fluorescent tube which is used for bulb-type fluorescent lamps is spirally wound, so that the effective length of the tube is increased. While a fluorescent tube is kept vertical, it is rotated and heated evenly at the part to be wound to a glass softening temperature or above by a heating device. The rotation of the fluorescent tube is stopped, and the part which is not facing a rod are heated. Then, the tube is clamped from a horizontal direction by a pair of clamps, and is wound around the rod at least 2.5 times by rotating the clamp arms in opposite directions while the arms gradually shift away from each other.

9 Claims, 8 Drawing Sheets

METHOD OF MANUFACTURING A SPIRAL FLUORESCENT TUBE

This application is a division of U.S. application Ser. No. 08/405,995 filed Mar. 17, 1995, now U.S. Pat. No. 5,610, 476.

FIELD OF THE INVENTION

The invention relates to a spiral fluorescent tube and a method and device for manufacturing the spiral fluorescent tube used for bulb-type fluorescent lamps.

BACKGROUND OF THE INVENTION

Bulb-type fluorescent lamps have been studied as a new type of illuminating device that can be applied directly to conventional incandescent lamp sockets and use less electricity, while maintaining brightness at the conventional level. However, since bulb-type fluorescent lamps are used in the same space as the space used for conventional incandescent lamps, the size of the lamps is limited. Also, fluorescent tube is required to be as long as possible so as to increase brightness. Therefore, bulb-type fluorescent lamps which have lengthened fluorescent tubes have been proposed. Such lamps include one using a double U-tube, which is formed by bending a straight fluorescent tube into a "U" shape and again bending the tube into a U shape in a direction at right angles to the previously bent surface; a lamp formed by binding a plurality (from four to six) of straight tubes with a bridge; and a lamp disclosed in U.S. Pat. No. 4,772,819 in which a plurality of ring fluorescent tubes are connected by a bridge.

In the conventional bulb-type fluorescent lamp, one fluorescent tube is bent into a U shape twice so as to form a double U-tube. Thus, although the method of forming the tube is relatively simple, limited space is not sufficiently utilized, and the amount of dead space is large. On the other hand, the conventional lamp which is formed by connecting a plurality of fluorescent tubes by a bridge requires a connecting process, so that the manufacturing process is not efficient. Also, the part above or below the bridge does not contribute to light generation, which creates unused or "dead" space.

SUMMARY OF THE INVENTION

It is an object of the invention to solve the above-noted conventional problems by providing a spiral fluorescent tube, which is a long arc tube used for bulb-type fluorescent lamps and has excellent filling and light generation efficiency, and wherein the method of manufacturing the tube has excellent productivity.

In order to accomplish this and other objects and advantages, it is preferable that the spiral fluorescent tube includes m+(½) winds wherein m represents an integer of two or above, that the end parts of the tube are parallel to each other, that wound parts of the tube are parallel to each other when the wound parts are observed from the top of the tube, and that a gap between the wound parts is ½ or less of the diameter of the tube.

It is also preferable that the end parts of the spiral fluorescent tube which are not wound spirally are parallel to each other, and that the parts are disposed at right angles to the axis of the wound parts and project in the same direction.

It is further preferable that the wound parts of the spiral fluorescent tube has at least one shape selected from the group consisting of a round shape, a pill shape, a discus shape and a polygonal shape when the tube is observed from a direction parallel to the center axis of the wound parts.

It is preferable that the wound parts are given a light reflective layer on at least a part of the inner surface.

It is preferable that the method of manufacturing the spiral fluorescent tube comprises the steps of:
heating a predetermined part of the tube to a glass softening temperature;
clamping each end of the tube with a clamp from a direction at right angles to the axis of the tube; and
rotating clamps in opposite directions to each other around a rod disposed at right angles to the axis while the clamps are shifted away from each other in a direction at right angles to the axis, thereby spirally winding the predetermined part of the tube heated to a glass softening temperature around the rod.

It is also preferable that the heating step includes a first heating process in which the predetermined part of the straight fluorescent tube is heated to a glass softening temperature while the tube is rotated around its axis and a second heating process in which the tube is heated from one direction after the rotation of the tube is stopped, and that the parts of the tube which are not facing the rod are heated in the second heating process while the tube is wound around the rod.

It is further preferable that the first heating process and the second heating process require a heating means, and that the heating means is shifted back and forth at a predetermined distance in a direction parallel to the axis of the tube, so that a temperature gradient is created between wound parts and non-wound parts of the tube.

It is preferable that the clamps are rotated around the rod in opposite directions to each other (¼)+(n/2) times, where n is an integer of 1 or above.

It is also preferable that the rod includes a first cross section and a second cross section in a direction at right angles to its lengthwise direction, that the rod has the first cross section when the straight fluorescent tube is wound, that the rod has the second cross section when the tube is removed after being wound, and that the area of the second cross section is smaller than the area of the first cross section.

It is further preferable that the rod has a cross-sectional shape selected from the group consisting of a round shape, a pill shape, a discus shape and a polygonal shape.

The device for manufacturing the spiral fluorescent tube comprises:
a rod aerially supported from a first predetermined direction;
a first clamp supporting a straight fluorescent tube at an area close to the rod from a second predetermined direction which is at right angles to the first predetermined direction;
a heating means for heating a predetermined part of the tube, which is not facing the rod, to a glass softening temperature;
second clamps disposed parallel to the axial direction of the rod and used for clamping parts adjacent to the ends of the tube in the first predetermined direction; and
a means for winding the tube around the rod by rotating the second clamps in opposite directions to each other around the axis of the rod while the second clamps are shifted away from each other parallel to the first predetermined direction.

It is also preferable that the rod includes a first cross section and a second cross section in a direction at right angles to the first predetermined direction, that the rod has the first cross section when the straight fluorescent tube is wound, that the rod has the second cross section when a wound fluorescent tube is removed from the rod, and that the area of the first cross section is larger than the area of the second cross section.

It is further preferable that the rod includes at least two cores and a stem which shifts back and forth in the first predetermined direction so as to open and close a tapered hollow part, and that the tapered hollow part is disposed internally in the rod.

It is preferable that the rod has at least one cross-sectional shape selected from the group consisting of a round shape, a pill shape, a discus shape and a polygonal shape.

It is also preferable that the heating means shifts back and forth at a predetermined distance in the second predetermined direction and provides a temperature gradient between wound parts of the straight fluorescent tube and non-wound parts.

It is further preferable that the heating means includes a first heating process and a second heating process, that the predetermined part of the straight fluorescent tube is heated to a glass melting point in the first heating process while the straight fluorescent tube is rotated, and that parts which are not facing the rod are heated in the second heating process while the straight fluorescent tube is wound around the rod.

It is preferable that the second clamps have a decreasing rotation radius as the straight fluorescent tube is wound around the rod.

It is also preferable that the second clamps and the clamped part of the straight fluorescent tube slide as the straight fluorescent tube is wound around the core.

By winding the straight fluorescent tube around the rod, the process of connecting with a bridge is not required, so that manufacturing becomes simple, and the amount of space which does not directly contribute to light generation is limited. Since the number of winds of the tube is m+(½) (where m is an integer of two or above), two filament parts of the tube are arranged in the same direction. Also, when the filament parts are parallel to each other, the tube can be connected to an inverter circuit or the like. Since the gap between the wound parts is ½ or less of the diameter of the tube, the tube can be lengthened and the brightness of a fluorescent lamp increases. Furthermore, by applying a light reflective layer on the inner surface of the wound parts that is facing the rod, the self absorption of fluorophor applied on the internal surface of the tube can be prevented, thus increasing brightness.

In manufacturing the spiral fluorescent tube, the predetermined part of the tube is heated by a gas burner or the like to a glass softening temperature while the tube is kept straight and rotated. Both ends of the tube which are not heated are clamped by an individual clamp from a direction at right angles to the axis of the tube. The clamps are then rotated around the horizontally and aerially supported rod in opposite directions to each other while they are shifted away from each other, and the part which is heated to a glass softening point is then wound around the rod. In winding the tube around the rod, the wound part of the tube which is facing the rod has a different elongation percentage compared with the part which is not facing the rod. In other words, the heating step is divided into first and second heating processes. In the first heating process, the predetermined part of the tube is evenly heated to a glass softening temperature while the tube is rotated around its axis. In the second heating process, the tube is heated from one direction as the rotation of the tube is stopped, so that the temperature of the wound part that is not facing the rod is set higher than the temperature of the part that is facing the rod. As a result, the tube is smoothly wound around the rod.

A heating means such as a gas burner is shifted up and down at a predetermined distance in a direction parallel to the axis of the tube, so that a temperature gradient is provided between the wound part and non-wound parts. Thus, residual stress between the spirally wound parts and non-wound parts is removed, and the spirally wound fluorescent tube is unlikely to be broken.

Since two clamps are rotated around the rod in opposite directions to each other n+(¼) times (where n represents an integer), the fluorescent tube is wound evenly, and the time required for winding is shortened. In rod cross sections at right angles to the first predetermined direction, the first cross section is used when the tube is wound, and the second cross section, whose area is smaller than that of the first cross section, is used when the tube is taken out after being wound. In other words, the rod includes at least two cores and a tapered hollow part internally. The tapered hollow part is opened and closed by sliding a stem, and the relative position of the cores is changed. As a result, the wound spiral fluorescent tube can be easily removed. Also, since the rod has at least one cross-sectional shape selected from the group consisting of a round shape, a pill shape, a discus shape and a polygonal shape, the effective length of the tube in a limited space becomes long.

As the fluorescent tube is wound around the core, the length of the tube which is not yet wound, becomes short However, since the rotation radius of the second clamps decreases as the tube is wound or since the second clamps and the clamped parts of the tube slide, the tube can be wound spirally at an even thickness.

Therefore, according to the manufacturing method and device of the invention, the spiral fluorescent tube of the invention is manufactured efficiently.

BRIEF DESCRIPTION OF THE DRAWINGS

FIG. 8($b$) is a cross sectional view of the rod when the cross section of the tube is small and is in a second stage.

FIG. 9($b$) is a front view of a rod of an embodiment of the invention.

FIG. 9($c$) is a front view of a rod of an embodiment of the invention.

FIG. 9($d$) is a front view of a rod of an embodiment of the invention.

DETAILED DESCRIPTION OF THE INVENTION

The invention will be described by referring to the following examples.

Figure 1:
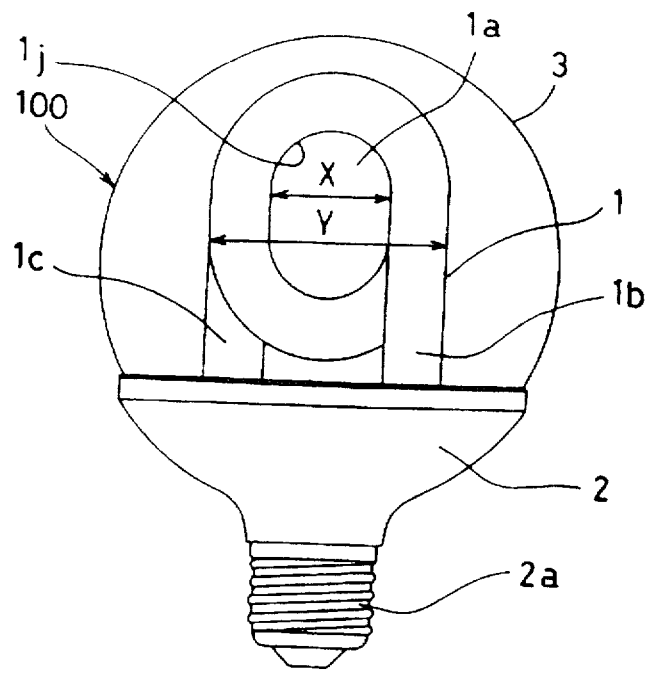
FIG. 1 is a side view of a fluorescent lamp using a spiral fluorescent tube of an embodiment of the invention.
Figure 2:
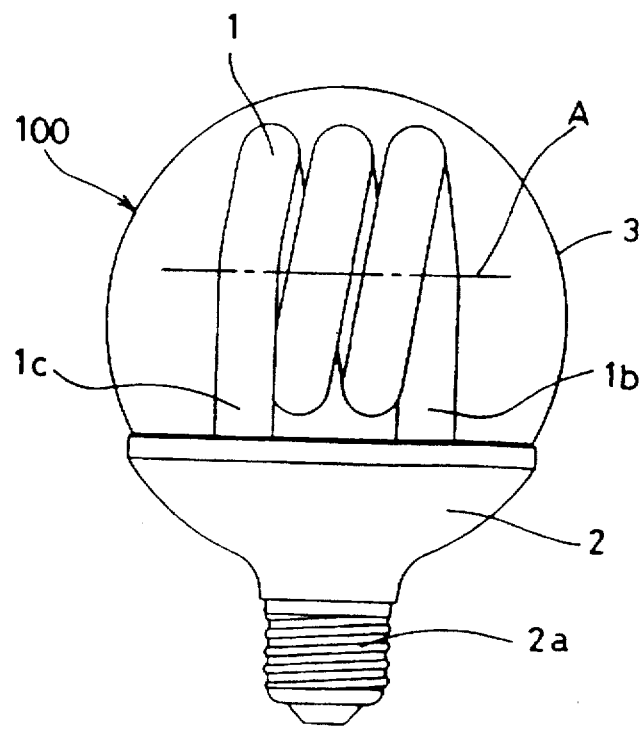
FIG. 2 is a front view of the fluorescent lamp.
Figure 3:
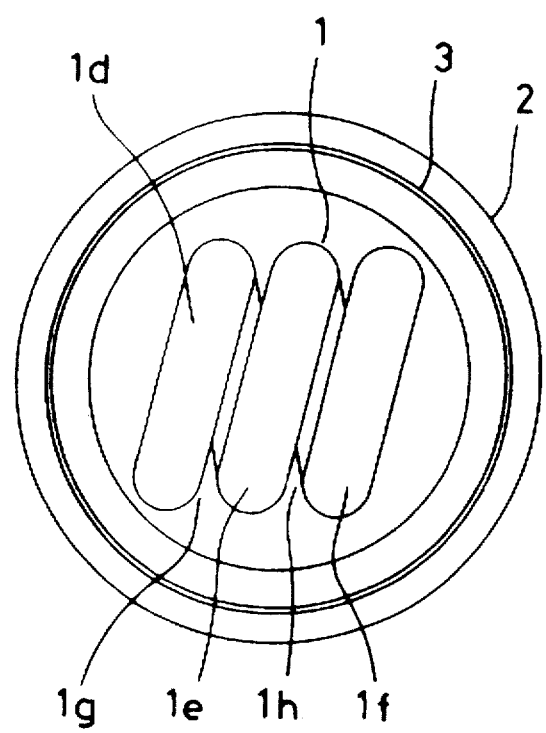
FIG. 3 is a plan view of the fluorescent lamp.

A spiral fluorescent tube of one embodiment of the invention is explained by referring to FIGS. 1, 2 and 3. In each figure, a fluorescent lamp 100 includes a base part 2 having a base 2a which can be applied to the socket of an incandescent lamp, a globe 3 applied to base part 2, and a fluorescent tube 1 wound spirally and inserted inside globe 3. In this example, fluorescent tube 1 is wound 2.5 times. For example, fluorescent tube 1 in FIG. 1 is spirally wound so as to form a pill-shape hollow section 1a. Two legs 1b and 1c of fluorescent tube 1 are connected to an inverter circuit or the like which is applied to base part 2. Also, as shown in FIGS. 1 and 2, legs 1b and 1c are parallel to each other, and at right angles to the axis (indicated as a dotted line A shown in FIG. 2) of a core which is used for winding fluorescent tube 1, and project in the same direction. As shown in FIG. 3, wound parts 1d, 1e and 1f of fluorescent tube 1 are substantially parallel to each other, and gaps 1g and 1h between the parts are ½ or less, preferably ⅓ or less, or more preferably ¼ or less (about ⅕ in this example) of the diameter of fluorescent tube 1. A light reflective layer may be applied to the internal surface of inner parts 1j (parts facing the rod) of the wound parts by a titanium oxide coating, an aluminum deposition or the like so as to prevent the absorption of light by fluorophor, which is applied on the internal surface of fluorescent tube 1.

A device for manufacturing a spiral fluorescent tube of one embodiment of the invention is explained by referring to FIGS. 4, 5, 6 and 7. The figures are perspective views showing the method and the device of manufacturing the spiral fluorescent tube. In each figure, a rod 10 is aerially and horizontally supported. A first and a second arm 20 and 30 are applied so as to rotate separately in a parallel direction to the axial direction of rod 10. In order not to disturb the rotation of first arm 20, for example, a shaft 21 of first arm 20 is hollow inside, and a shaft 11 aerially supporting rod 10 is inserted and attached to the hollow part of shaft 21. On the other hand, there is no particular limitation on shaft 31 of second arm 30. Second clamps 22 and 32 are applied to first and second arms 20 and 30 respectively so as to support parts adjacent to the ends of the tube in a horizontal direction. First and second arms 20 and 30 can shift back and forth in a horizontal direction indicated as arrows D and E shown in FIG. 4. The arms rotate around the shafts as their center, in the directions indicated as arrows G and H shown in FIG. 5.

As fluorescent tube 1 is wound around rod 10, the parts of the tube which are not yet wound become shorter. Second clamps 22 and 32 are fixed to arms 20 and 30 respectively. When each one of second clamps 22 and 32 firmly supports fluorescent tube 1, the elongation of the tube becomes large as the tube is wound around rod 10. The diameter of the tube becomes small as the elongation becomes large. Thus, the tube cannot be wound spirally while keeping the thickness of the tube even. In order to solve this problem, a slide 23 (the slide on second arm 30 is not shown in the figure) is disposed between the arm and the second clamp in the radial direction of the arm, so that the rotation radius of second clamps 22 and 32 becomes smaller as fluorescent tube 1 is wound around rod 10. Or alternatively, second clamps 22 and 32 and the clamped parts of fluorescent tube 1 may be made to slide.

In order to support straight fluorescent tube 1 vertically, a first clamp 40 is applied near rod 10. First clamp 40 can rotate in a predetermined direction (indicated as an arrow B shown in FIG. 4), and shifts in a vertical direction (indicated as an arrow F shown in FIG. 5). Fluorescent tube 1 is kept vertical by first clamp 40, and a heating device 50 such as a gas burner is positioned close to the tube. Heating device 50 shifts at a predetermined distance (for instance, within the range of 1–5 cm) in a vertical direction (indicated as an arrow C shown in FIG. 4). After heating fluorescent tube 1, heating device 50 is shifted away from the tube to a predetermined distance.

Figure 4:
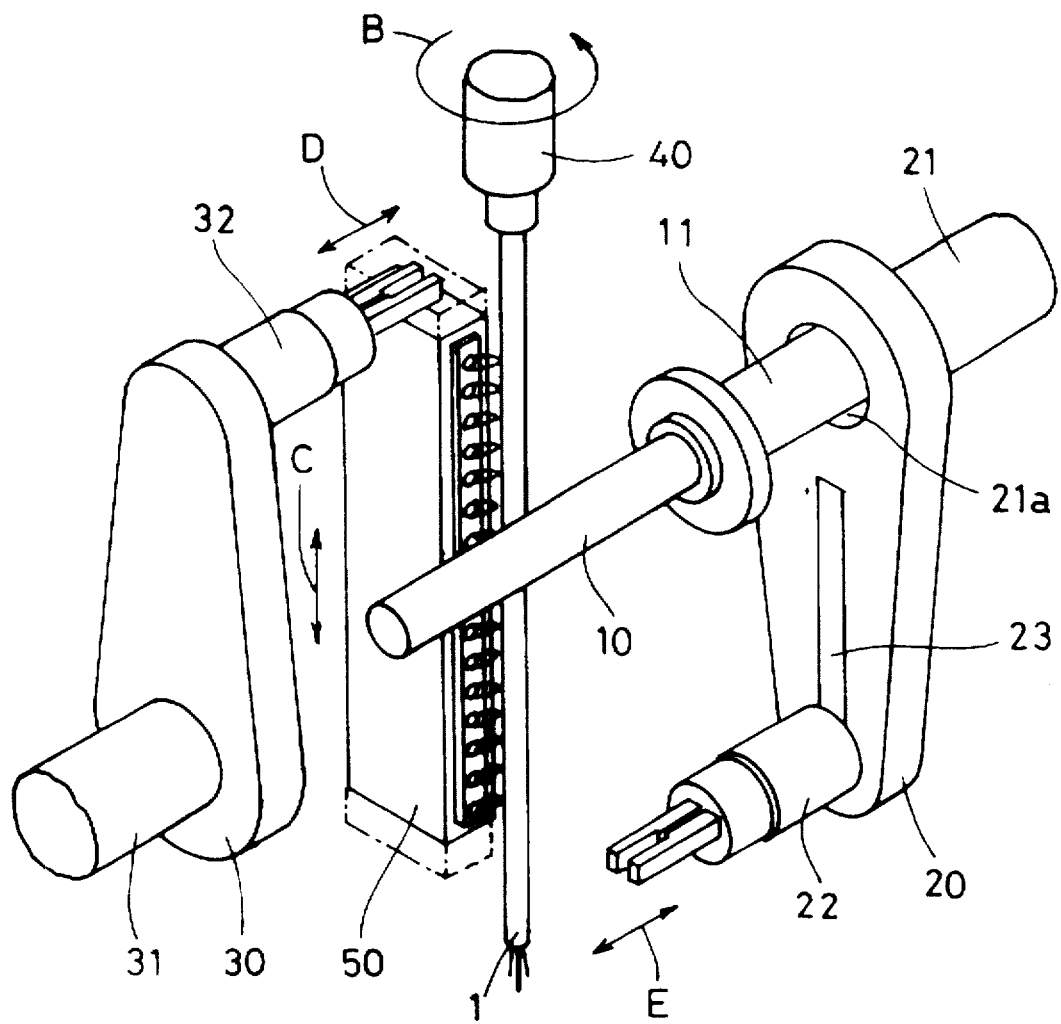
FIG. 4 is a perspective view showing a method of manufacturing a spiral fluorescent tube and a device for manufacturing the tube of an embodiment of the invention.

By referring to the device of manufacturing the spiral fluorescent tube shown in FIGS. 4–7, the method of the invention is explained. First, straight fluorescent tube 1 is kept vertical by first clamp 40, and the clamp is rotated in the direction of arrow B as shown in FIG. 4. Then, the fluorescent tube is set close to heating device 50, and the predetermined length of the tube is evenly heated to a glass softening point. At the same time, heating device 50 is shifted in the vertical direction of arrow C as shown in FIG. 4 so as to provide a temperature gradient between the heated part and non-heated parts. Filaments or the like may be applied to parts around the ends of fluorescent tube 1, so that the parts are not heated and kept almost at a constant temperature even when the tube is spirally wound. The central part of the tube is heated to a glass softening point or above so as to be wound spirally. Thus, by providing the temperature gradient, distortions are distributed and the tube can be smoothly wound in a spiral condition. At the same time, the residual stress of glass after winding can be minimized, and breakage of the tube can be prevented even if some shock is given to the tube.

Figure 5:
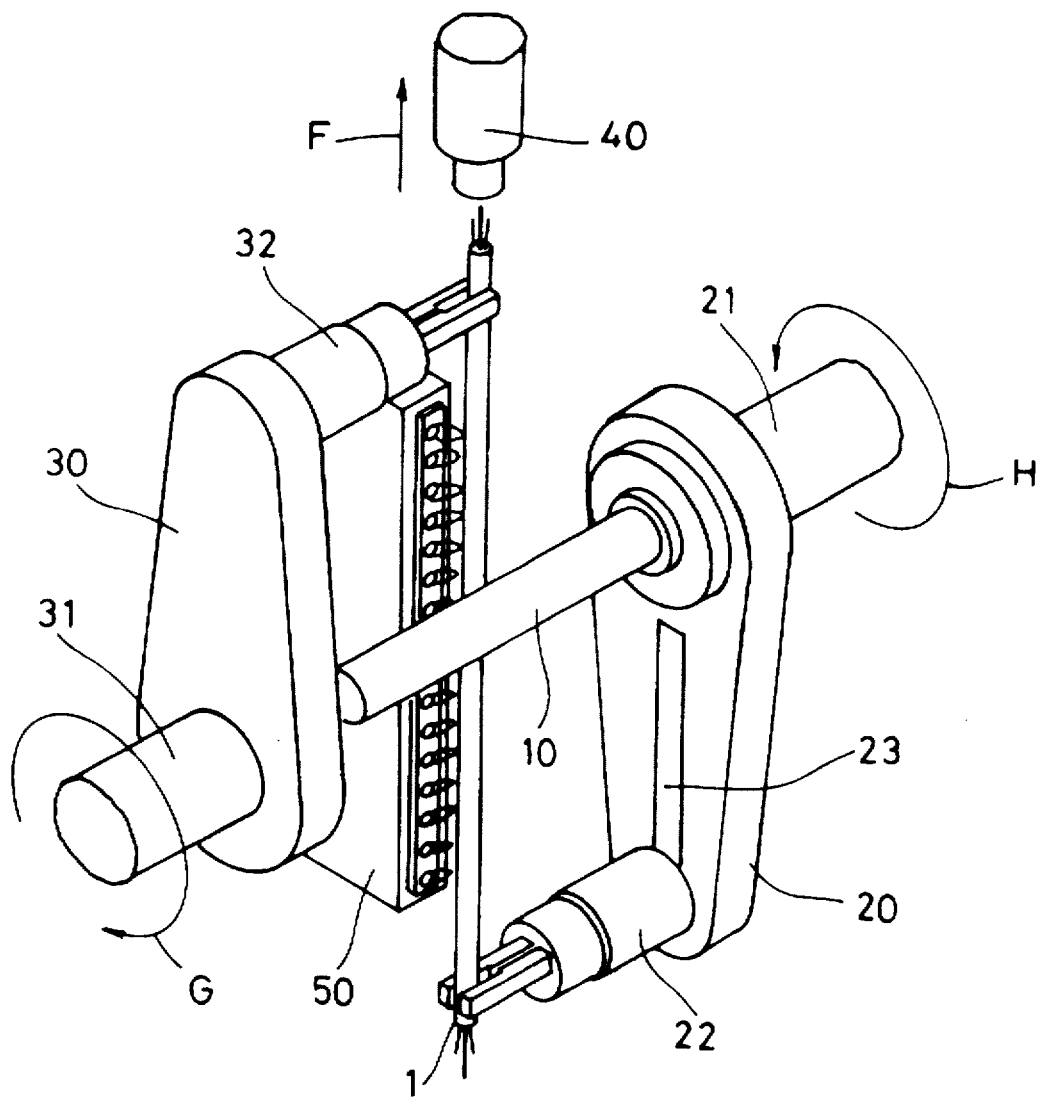
FIG. 5 is a perspective view showing the method and the device of manufacturing the spiral fluorescent tube.

The rotation of first clamp 40 is then stopped, and first and second arms 20 and 30 are shifted forward in the directions of arrows D and E respectively as shown in FIG. 4. As shown in FIG. 5, second clamps 22 and 32 support fluorescent tube 1 vertically. First clamp 40 is released upward in the direction of arrow F as shown in FIG. 5. Fluorescent tube 1 is heated by heating device 50 from one direction. When the diameters of rod 10 and fluorescent tube 1 are 30 mm and 12 mm respectively, the inner diameter of the wound parts (for example, diameter X shown in FIG. 1) is 30 mm. The outer diameter (for instance, diameter Y shown in FIG. 1) is 54 mm. In other words, the elongation of parts of the tube facing rod 10 and that of parts which are not facing the rod are totally different. Therefore, the temperature of the part not facing the rod is set higher than that of the part facing the rod so as to make it softer. As a result, fluorescent tube 1 is smoothly wound around rod 10.

Figure 6:
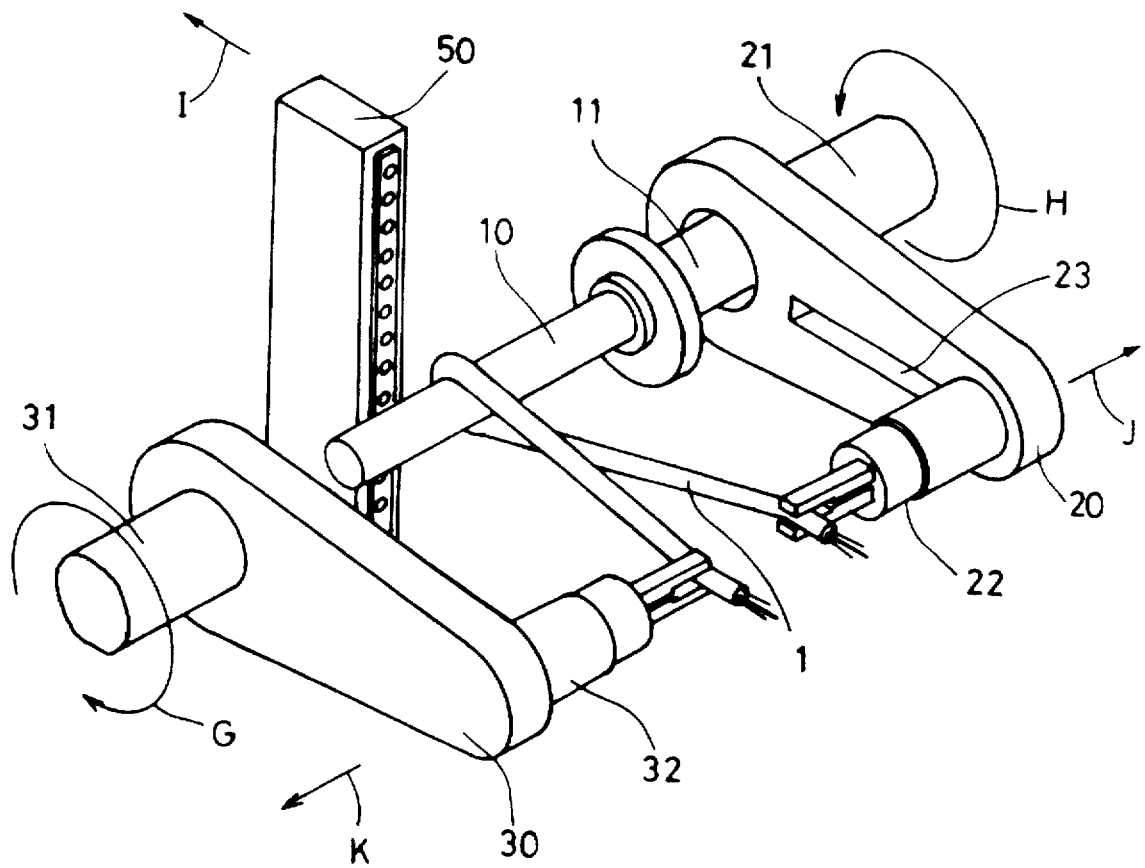
FIG. 6 is a perspective view showing the method and the device of manufacturing the spiral fluorescent tube.
Figure 7:
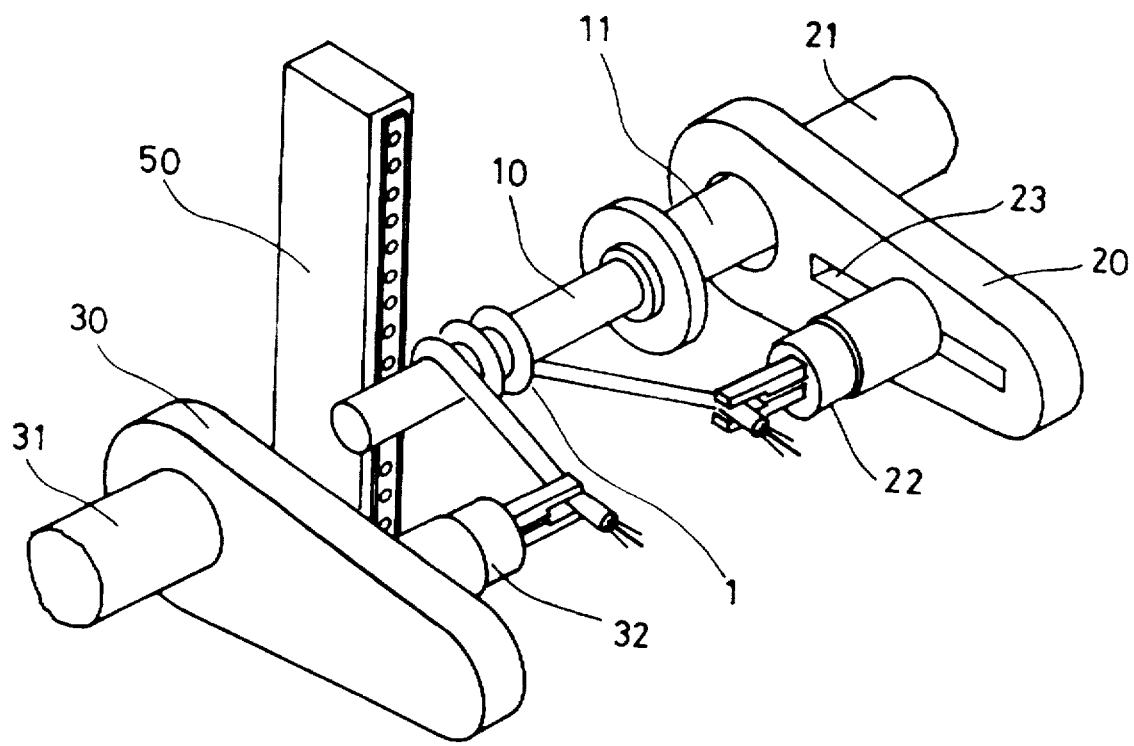
FIG. 7 is a perspective view showing the method and the device of manufacturing the spiral fluorescent tube.

First and second arms 20 and 30 are rotated in opposite directions as shown by arrows G and H respectively in FIG. 5. Thus, the part of fluorescent tube 1 heated to a glass softening point is wound around rod 10 as shown in FIG. 6. At this point, it is no longer necessary to heat the tube, so that heating device 50 is shifted away in the direction of arrow I as shown in FIG. 6. Along with the rotation, first and second arms 20 and 30 shift away from each other in the directions of arrow J and K (horizontal directions) respectively. As the arms shift away from each other in the horizontal direction, fluorescent tube 1 is wound around rod 10 in a spiral condition for a predetermined number of times as shown in FIG. 7, thus forming a spiral fluorescent tube. The tube is removed from rod 10, and is assembled as a part of a fluorescent lamp after being annealed.

The tube is wound 2.5 times in this example. However, the number of windings can be more than 2.5 times as long as the rotation is m+(½) times (where m represents an integer of 2 or above). First and second arms 20 and 30 preferably rotate in opposite directions by the same number of (¼)+(n/2) rotations where n represents an integer of 1 or above. However, depending on the structure of the device and the number of windings, the number of rotations of first and second arms 20 and 30 can be differentiated.

Figure 8A:
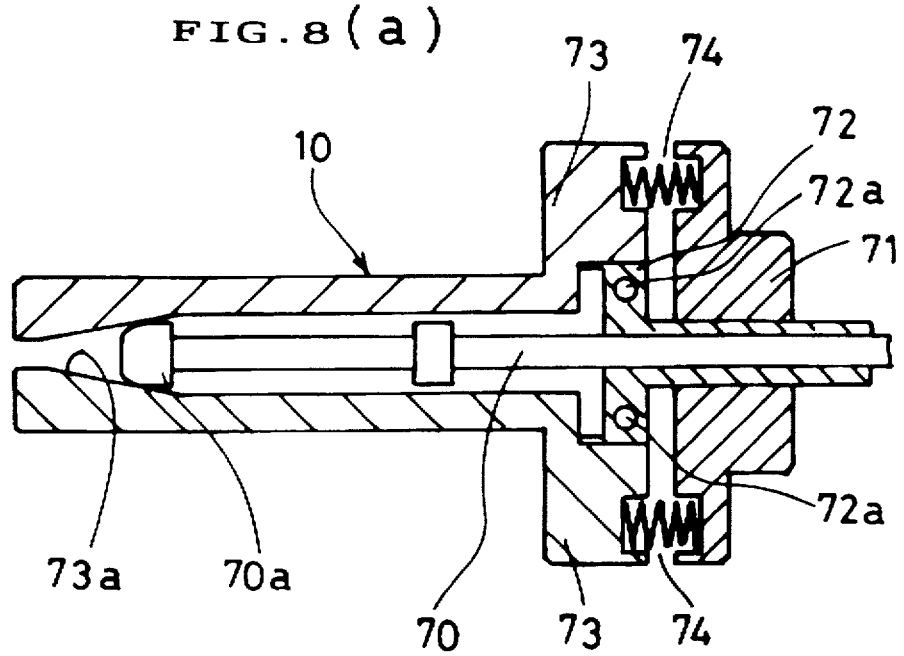
FIG. 8($a$) is a cross-sectional view of a rod used in a method and a device of manufacturing a spiral fluorescent tube of an embodiment of the invention when the cross section of the tube is large and is in a first stage.
Figure 8B:
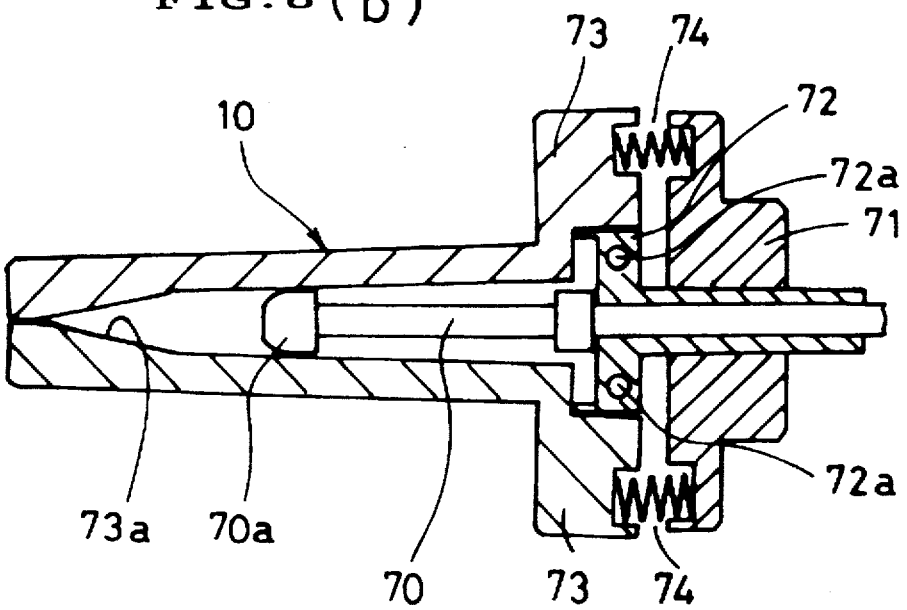

The structure of rod 10 is explained by referring to FIGS. 8(a) and 8(b) and FIG. 9. FIG. 8(a) shows a cross-sectional view of rod 10, which is in a first state having a large cross-sectional area, when the fluorescent tube is wound around rod 10. FIG. 8(b) shows the cross-sectional view of rod 10, which is in a second state having a smaller cross-sectional area, when the spirally wound fluorescent tube is removed. In FIGS. 8(a) and (b), rod 10 includes a stem 70 which can shift back and forth in the axial direction of the rod, a fixed flange 71 applied at right angles to the axis, a bearing 72 which is applied to fixed flange 71 and supports stem 70 for sliding, two or more cores 73 which are pivoted so as to rotate around a spindle 72a as the center, and a plurality of springs 74 which are applied between fixed flange 71 and cores 73 and energize the rotating force of cores 73. A tapered hollow part 73a is formed inside the rod.

Figure 9A:
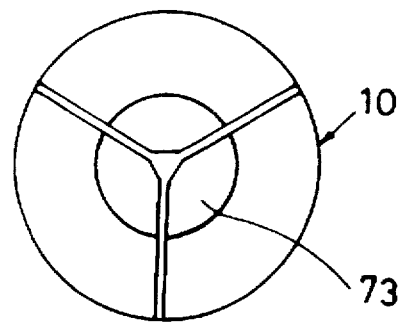
FIG. 9($a$) is a front view of a rod of an embodiment of the invention.
Figure 9B:
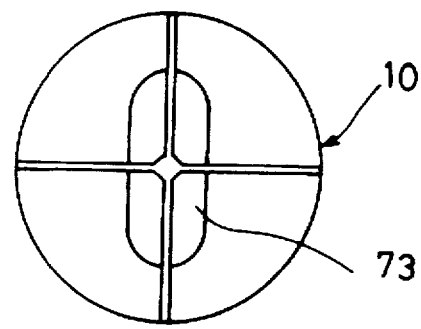
Figure 9C:
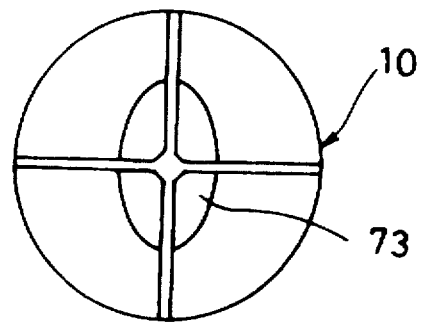
Figure 9D:
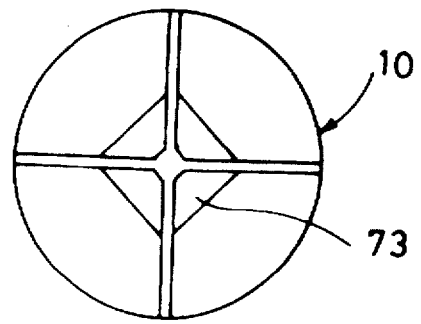

As shown in FIG. 8(a), a part 70a at the edge of stem 70 is moved, so that the tapered hollow part is widened by part 70a, and the edges of cores 73 separate from each other. As a result, rod 10 is in the first state with a large cross-sectional area. On the other hand, when stem 70 is shifted to the right side as shown in FIG. 8(b), part 70a is shifted away from tapered hollow part 73a. Cores 73 rotate in a predetermined direction by the energizing force of springs 74, and rod 10 is in the second state with a small cross-sectional area. Thus, since rod 10 has two states with a large and a small cross-sectional area, the fluorescent tube spirally wound can be easily removed from the rod. Rod 10 has a round cross-sectional shape as shown in FIG. 9(a), a pill-shape cross-sectional shape as shown in FIG. 9(b), a discus shape cross-sectional shape as shown in FIG. 9(c), or a polygonal cross-sectional shape as shown in FIG. 9(d).

In the above-noted example, first and second arms 20 and 30 applied with second clamps 22 and 32 rotate in opposite directions while shifting away from each other. However, first and second arms 20 and 30 may be merely rotated while an expansion mechanic such as an air cylinder and a hydraulic cylinder is interlocked with the rotation of first and second arms 20 and 30 and is expanded by applying the mechanic to second clamps 22 and 32.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method of manufacturing a spiral fluorescent tube comprising the steps of:

heating a part of a straight fluorescent tube to a glass softening temperature clamping each end of said straight fluorescent tube with a corresponding clamp from a direction at a right angle to an axis of said straight fluorescent tube; and rotating said corresponding clamps in opposite directions to each other around a rod disposed at a right angle to said axis while said corresponding clamps are shifted away from each other in a direction at right angles to said axis, thereby spirally winding a predetermined part of said straight fluorescent tube heated to said glass softening temperature around said rod;

wherein said heating step comprises a first heating process in which a part of said straight fluorescent tube is heated to a glass softening temperature while said straight fluorescent tube is rotated around its axis, and a second heating process in which parts of said straight fluorescent tube are heated from one direction after the rotation of said straight fluorescent tube is stopped;

wherein said parts of said straight fluorescent tube comprises parts of said straight fluorescent tube which are not facing the rod; and wherein said parts of said straight fluorescent tube are heated in said second heating process while said straight fluorescent tube is wound around said rod.

2. The method of manufacturing a spiral fluorescent tube as in claim 1, wherein the first heating process and the second heating process require a heating means; and wherein said heating means is shifted back and forth at a distance in a direction parallel to said axis of the straight fluorescent tube, so that a temperature gradient is created between wound parts and non-wound parts of said straight fluorescent tube.

3. The method of manufacturing a spiral fluorescent tube as in claim 1, wherein the corresponding clamps are rotated around the rod in opposite directions to each other (¼)+(n/2) times, where n is an integer of 1 or above.

4. The method of manufacturing a spiral fluorescent tube as in claim 1, wherein the rod comprises a first cross section and a second cross section in a direction at a right angle to its lengthwise direction; wherein said rod has said first cross section when the straight fluorescent tube is wound; wherein said rod has said second cross section when said straight fluorescent tube is removed from said rod after being wound; and wherein an area of said second cross section is smaller than an area of said first cross section.

5. The method of manufacturing a spiral fluorescent tube as in claim 1, wherein the rod has a cross-sectional shape selected from the group consisting of a round shape, a pill shape, a discus shape and a polygonal shape.

6. A method of manufacturing a spiral fluorescent tube comprising the steps of:

heating a part of a straight fluorescent tube to a glass softening temperature;

clamping each end of said straight fluorescent tube with a corresponding clamp from a direction at a right angle to an axis of said straight fluorescent tube; and rotating said corresponding clamps in opposite directions to each other around a rod disposed at a right angle to said axis while said corresponding clamps are shifted away from each other in a direction at right angles to said axis, thereby spirally winding a predetermined part of said straight fluorescent tube heated to said glass softening temperature around said rod, wherein said corresponding clamps are rotated around said rod in opposite directions to each other (¼)+(n/2) times, where n is an integer of 1 or above.

7. A method of manufacturing a spiral fluorescent tube as in claim 6, wherein the heating step comprises a first heating process in which a part of said straight fluorescent tube is heated to a glass softening temperature while said straight fluorescent tube is rotated around its axis, and a second heating process in which parts of said straight fluorescent tube are heated from one direction after the rotation of said straight fluorescent tube is stopped; wherein said parts of said straight fluorescent tube comprises parts of said straight fluorescent tube which are not facing the rod; and wherein said parts of said straight fluorescent tube are heated in said second heating process while said straight fluorescent tube is wound around said rod.

8. The method of manufacturing a spiral fluorescent tube as in claim 6, wherein said rod comprises a first cross section and a second cross section in a direction at a right angle to its lengthwise direction; wherein said rod has said first cross section when the straight fluorescent tube is wound; wherein said rod has said second cross section when said straight fluorescent tube is removed from said rod after being wound; and wherein an area of said second cross section is smaller than an area of said first cross section.

9. The method of manufacturing a spiral fluorescent tube as in claim 6, wherein said rod has a cross-sectional shape selected from the group consisting of a round shape, a pill shape, a discuss shape and a polygonal shape.

* * * * *